Dec. 29, 1931.    J. E. NELSON    1,838,955
ADJUSTABLE THERMOSTAT
Filed Jan. 10, 1927
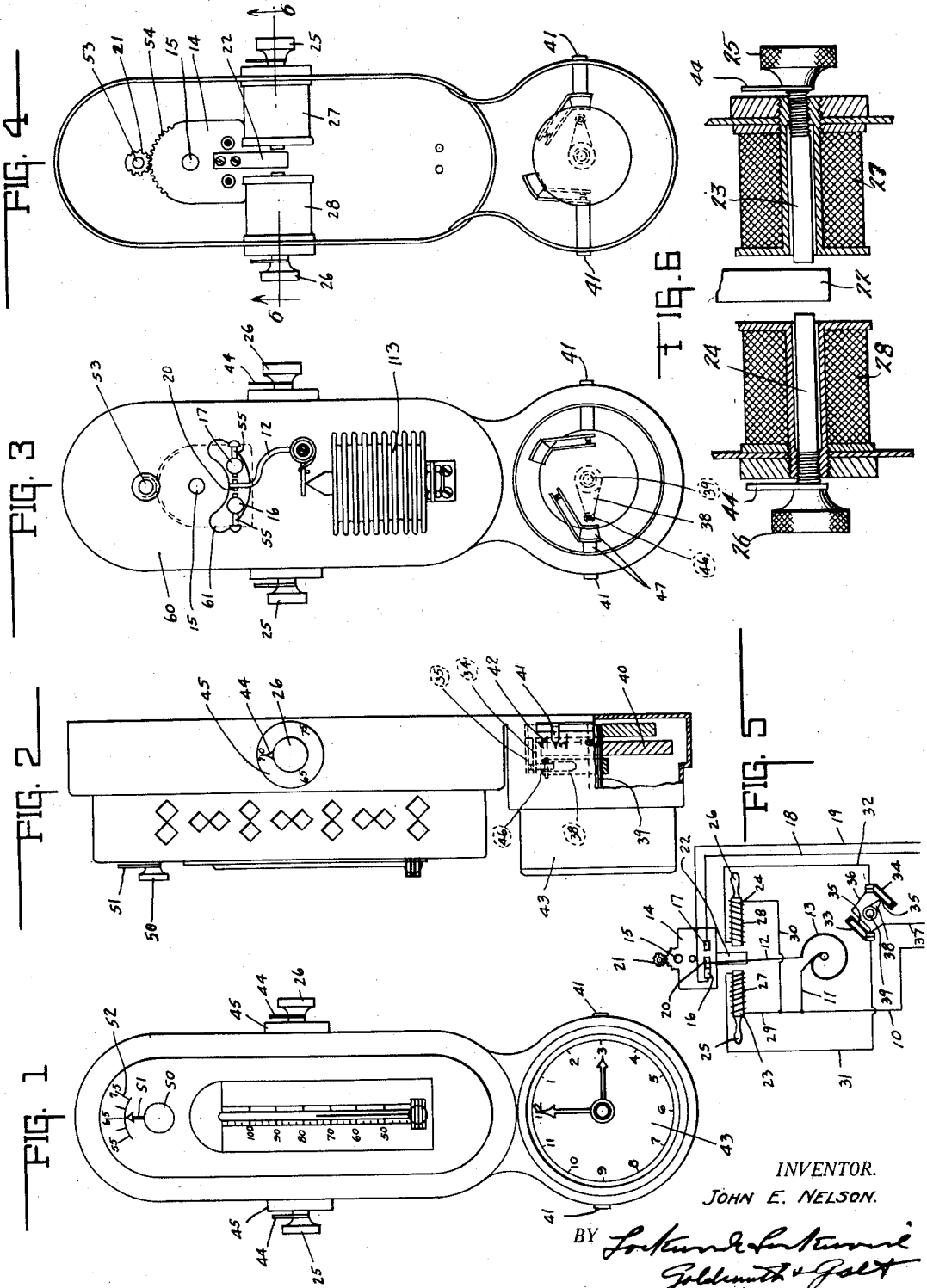
INVENTOR.
JOHN E. NELSON.
BY
ATTORNEYS.

Patented Dec. 29, 1931

1,838,955

UNITED STATES PATENT OFFICE

JOHN E. NELSON, OF INDIANAPOLIS, INDIANA

ADJUSTABLE THERMOSTAT

Application filed January 10, 1927. Serial No. 160,145.

This invention relates to automatic time and temperature controlled circuits.

The chief object of the invention is to control a circuit in such a manner that the same is adapted to maintain a plurality of predetermined temperature conditions at predetermined times.

The chief feature of the invention consists in providing a control which is responsive to temperature changes for maintaining a predetermined temperature or temperature conditions within a predetermined range and the automatic shifting of this range at predetermined times from one range to another and also the manual shifting of this range to the temperature desired independent of the automatic control.

One feature of the invention consists in the adjustable arrangement connection with the several controls, whereby the periods of operation can be changed and also the temperature range can be shifted.

A further feature of the invention consists in the high degree of time accuracy obtainable by reason of the elimination of work from the time registering mechanism (clock), that is, the clock constitutes a remote control device for controlling the mechanism that actually performs the work.

The full nature of the invention will be understood from the accompanying drawings and the following description and claims:

In the drawings Fig. 1 is a front elevational view of a time and temperature control device. Fig. 2 is a side elevational view thereof with portions shown in half section illustrating certain parts in detail. Fig. 3 is a front view of a portion of the mechanism with the cover removed. Fig. 4 is a rear view thereof. Fig. 5 is a wiring diagram of one form of control circuit.

Fig. 6 is a transverse section showing the adjustable cores, and is taken on line 6—6 of Fig. 4 and in the direction of the arrows.

In Fig. 5, 10 indicates a common supply line, 11 a branch leading to a member 12 which is movable by a thermally responsive element 13, shown in Fig. 5 as a metallic thermostat and in Fig. 3 as a sylphon thermostate 113. A plate 14 is pivotally mounted at 15 and insulatably supports a pair of contacts 16 and 17, the same being connected to the control wires 18 and 19. Said control wires can be connected to a reversible motor and contact 20, carried by the movable element 12, is adapted to close the circuit from line 11 through either one of the contacts 16 or 17, depending upon the temperature. By adjusting the gap between the contacts 16 and 17 and by adjusting the thermally responsive means 13 any degree of temperature differential can be maintained. Thus, a one or two degree difference is all that will be obtained from any given temperature setting if the parts are properly proportioned or adjusted.

Through the manually operable member 21 the contact supporting plate 14 may be tilted to the right or left and thus changes the relative position of the thermosat responsive member 13 to the contacts 16 and 17. By swinging the plate 14 in one direction contact 20 engages contact 16 and thus closes the circuit controlled by line 19 to secure the desired result. This in effect means the shifting of the temperature limit from that originally set to that caused by the shifting of the plate 14.

Secured to or carried by the plate 14 is an armature or keeper 22 and said keeper is positioned between two cores 23 and 24, each of which is manually adjustable through their handles 25 or 26 respectively. Coils 27 and 28 surround said cores and are connected by branch lines 29 and 30, respectively, to the common supply line 10 and therefore are in shunt. Whenever the solenoid 27 is energized, keeper 22 moves toward the left and brings contact 17 nearer contact 20 or into engagement therewith. Whenever solenoid 28 is energized, keeper 22 moves counterclockwise for causing the same operation between contacts 20 and 16. Whenever a solenoid is energized the keeper and plate is tilted, this in effect being equivalent to the thermostat blade element 20 engaging the appropriate contact 16 or 17. Operatively speaking therefore the thermostat control and solenoid control are in parallel arrangement since either secures the same result. Similarly sufficient tilting of the plate 14 by pinion 21 accomplishes the same result.

Leading from the several coils 27 and 28 are the lines 31 and 32 respectively, each of which leads to a switch member 33 and 34 respectively. Switch members 35 adjacent each are electrically connected together by the line 36 and to a common return line 37. Switches 33 and 35, and 34 and 35 are normally opened. A contactor, or actuator, 38 mounted for rotation with the shaft 39, is adapted to successively engage the contacts 35 and to cause their movement into engagement with the adjacent contact 33 or 34, and thus close the respective circuit and energize the respective solenoid 27 or 28 included therein.

The several switches 33 and 35, and 34 and 35 are mounted for independent relative adjustment upon plates 40. Movement of the pointer 41 on each disc positions said insulation disc in such position as to correspond to the desired hour at which it is desired that the particular control circuit be energized. The scale 42 is provided for indicating the setting of the hour. A similar scale on the opposite side will provide for the setting of the other switch. The shaft 39 is one which is suitably operated or connected to a time controlled mechanism or clock 43 so as to have a single revolution every 24 hours, thereby securing cyclic operation of the switches.

If it is desired to maintain a temperature of 60 degrees from 10.30 p. m. until 6 p. m. and a temperature of 68, 70 or 72 degrees from 6 a. m. until 10.30 p. m the proper switch mounted on its disc will be adjusted so as to be engaged by the pointer or actuating member 38 for closing the circuit at the predetermined time for energizing the respective solenoid and for causing the keeper to move, thus automatically causing tilting movement of the insulating plate 14 at a predetermined time. The position of the core which is manually adjusted, secures the predetermined temperature range, and adjacent each of the handles or the cores is mechanism for securing such shifting of the relative position including a pointer 44 associated with the dial 45. Positioning of the pointer 44 to the desired temperature secures positioning of the core at the desired position to secure closing of the control circuit at a time when contactor or actuator 38 has moved into a position where it closes the selected time switch which closes the electrical circuit through the solenoid connected thereto. Closing the electrical circuit through either solenoid 27 or 28 magnetizes the respective core 23 or 24, thereby causing the keeper 22 to be selectively attracted with the result that plate 14 is moved to the right or left.

Herein the switch actuator 38 carries a roller 46 and the several spring fingers of the paired switch members 33—35 and 35—34 are insulatably mounted as at 47 upon the discs 40 which are adjusted to the desired position through the combination pointer and shifting member 41.

The knob 50 carrying pointer 51 adjacent scale 52 constitutes the manual adjustment. The shaft 53 is rotatable by said finger piece 50 and carries the pinion 21 meshing with teeth 54 formed on the plate 14 which carries the armature or keeper 22. Herein contacts 16 and 17 are shown comprising metallic studs threadedly supporting transversely positioned pins or bolts 55 whereby the gap between the contacts is adjusted to any desired temperature range, that is, one or two degrees, etc. The main frame 60 includes an arcuate slot 61 concentric with the pivot 15 and the studs 16 and 17 project therethrough into exposed relation with the contact 20 positioned between them, said contact being carried by the moving member 12, and thermally movable by reason of the thermally responsive actuating mechanism.

From the foregoing it will be understood that at a predetermined time in the morning one circuit will be closed by the time control switch, this energizing the appropriate coil which attracts the keeper and tilts the plate 14 into the desired position corresponding to a new predetermined temperature, for example, from 60 to 70 degrees. The control circuit thus completed will remain closed as long as the thermostat indicates a temperature below 70 degrees. When it begins to indicate a temperature greater than 70 degrees it will be positioned between the contacts 16 and 17 until such time as the temperature has increased to that desired, whereupon the opposite control circuit will be closed to secure a reduction in temperature and this reduction will continue until the first mentioned circuit is again closed. Until the other solenoid is energized by the actuation of the other time control switch, the aforesaid temperature range or condition will be automatically maintained. At this time then the keeper will be reversely attracted and a new temperature condition will be effected. If at any time it is desired to maintain a predetermined temperature condition the adjustment of the knob 50 tilts plate 14 into the desired position for securing such adjustment. The friction of the several parts is sufficient to hold the plate 14 in the adjusted position since the cores are not constantly energized. Two variables time and temperature, are thus corelated through the device to secure predetermined temperature conditions at predetermined times.

The difference in temperature limits is variable by adjusting contacts 55 (16 and 17) and by adjusting the core positioning. Relatively close limitation can be obtained if desired through either adjustment and time control operation can be superimposed thereon through clock-wise energization by the solenoid tilting plate 14. The main work circuit in each instance includes contact 16 or 17 and line 18 or 19 respectively, line 11, thermostat 13 and switch member 12.

The invention claimed is:

1. A control mechanism including a pair of spaced contacts, a contact positioned therebetween and adapted to engage either contact for completing a circuit therethrough, a pivotal support for said contacts, a pair of axially aligned and operatively opposed solenoids for selectively tilting said pivotal support for securing contact engagement, said support including a portion positionable between said solenoids, and adjustable cores for said solenoids and operatively associated with the portion of the pivotal support included between the solenoids for limiting the tilting movement.

2. A control mechanism including a pair of spaced contacts, a contact positioned therebetween and adapted to engage either contact for completing a circuit therethrough, a pivotal support for said spaced contacts, solenoids for tilting said support for causing contact engagement, adjustable cores for said solenoids for limiting the tilting movement of said support, a clock mechanism, a switch for each solenoid arranged for successive switch operation by said clock mechanism, and means adjustably supporting said switches and adjusting the time of switch operation.

3. A control mechanism including a pair of spaced contacts, a contact positioned therebetween and adapted to engage either contact for completing a circuit therethrough, a pivotal support for said spaced contacts, solenoids for tilting said support for causing contact engagement, adjustable cores for said solenoids for limiting the tilting movement of said support, a clock mechanism, a switch for each solenoid arranged for successive switch operation, a single member operatively connected to the clock mechanism and successively and intermittently engaging said switches for operating the same, and means adjustably supporting said switches for adjusting the time of switch operation.

4. A control mechanism including a pair of spaced contacts, a contact positioned therebetween and adapted to engage either contact for completing a circuit therethrough, a pivotal support for said contacts, a pair of axially aligned and operatively opposed solenoids for selectively tilting said pivotal support for securing contact engagement, said support including a portion positionable between said solenoids, a clock mechanism, a switch for each solenoid arranged for successive switch operation by said clock mechanism, and means adjustably supporting said switches and adjusting the time of switch operation.

5. A control mechanism including a pair of spaced contacts, a contact positioned therebetween and adapted to engage either contact for completing a circuit therethrough, a pivotal support for said contacts, a pair of axially aligned and operatively opposed solenoids for selectively tilting said pivotal support for securing contact engagement, said support including a portion positionable between said solenoids, a clock mechanism, a switch for each solenoid arranged for successive switch operation, a single member operatively connected to the clock mechanism and successively and intermittently engaging said switches for operating the same.

6. A control mechanism including a pair of spaced contacts, a contact positioned therebetween and adapted to engage either contact for completing a circuit therethrough, a pivotal support for said contacts, a pair of axially aligned and operatively opposed solenoids for selectively tilting said pivotal support for securing contact engagement, said support including a portion positionable between said solenoids, a clock mechanism, a switch for each solenoid arranged for successive switch operation, a single member operatively connected to the clock mechanism and successively and intermittently engaging said switches for operating the same, and means adjustably supporting said switches for adjusting the time of switch operation.

7. A control mechanism including a pair of spaced contacts, a contact positioned therebetween and adapted to engage either contact for completing a circuit therethrough, a pivotal support for said contacts, a pair of axially aligned and operatively opposed solenoids for selectively tilting said pivotal support for securing contact engagement, said support including a portion positionable between said solenoids, adjustable cores for said solenoids and operatively associated with the portion of the pivotal support included between the solenoids for limiting the tilting movement, a clock mechanism, a switch for each solenoid arranged for successive switch operation, and means adjustably supporting said switches and adjusting the time of switch operation.

8. A control mechanism including a pair of spaced contacts, a contact positioned therebetween and adapted to engage either contact for completing a circuit therethrough, a pivotal support for said contacts, a pair of axially aligned and operatively opposed solenoids for selectively tilting said pivotal support for securing contact engagement, said support including a portion positionable between said solenoids, adjustable cores for said solenoids and operatively associated with the portion of the pivotal support included between the solenoids for limiting the tilting movement, a clock mechanism, a switch for each solenoid arranged for successive switch operation, a single member operatively connected to the clock mechanism and sucecssively and intermittently engaging said switches for operating the same.

9. A control mechanism including a pair of spaced contacts, a contact positioned therebetween and adapted to engage either contact for completing a circuit therethrough, a pivotal support for said contacts, a pair of axially aligned and operatively opposed solenoids for selectively tilting said pivotal support for securing contact engagement, said support including a portion positionable between said solenoids, adjustable cores for said solenoids and operatively associated with the portion of the pivotal support included between the solenoids for limiting the tilting movement, a clock mechanism a switch for each solenoid arranged for successive switch operation, a single member operatively connected to the clock mechanism and successively and intermittently engaging said switches for operating the same, and means adjustably supporting said switches for adjusting the time of switch operation.

In witness whereof, I have hereunto affixed my signature.

JOHN E. NELSON.